US009876398B2

United States Patent
Miyajima et al.

(10) Patent No.: US 9,876,398 B2
(45) Date of Patent: Jan. 23, 2018

(54) STATOR CORE FOR ROTATING ELECTRIC MACHINE

(71) Applicant: HONDA MOTOR CO., LTD., Tokyo (JP)

(72) Inventors: Kazufusa Miyajima, Wako (JP); Kenta Umetsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 583 days.

(21) Appl. No.: 14/301,276

(22) Filed: Jun. 10, 2014

(65) Prior Publication Data

US 2014/0368080 A1   Dec. 18, 2014

(30) Foreign Application Priority Data

Jun. 14, 2013   (JP) .................................. 2013-126044

(51) Int. Cl.
*H02K 1/06* (2006.01)
*H02K 1/14* (2006.01)
*H02K 1/02* (2006.01)

(52) U.S. Cl.
CPC .............. *H02K 1/148* (2013.01); *H02K 1/02* (2013.01); *H02K 1/14* (2013.01); *H02K 2201/09* (2013.01)

(58) Field of Classification Search
CPC .................................. H02K 1/14; H02K 1/02
USPC .................... 310/216.001–216.137
See application file for complete search history.

(56) References Cited

U.S. PATENT DOCUMENTS

| 7,122,933 | B2 * | 10/2006 | Horst ....................... H02K 3/18 310/179 |
| 8,164,230 | B2 * | 4/2012 | Sugiyama ................ H02K 1/18 310/216.004 |
| 8,887,377 | B2 * | 11/2014 | Hasegawa ............ H02K 15/024 29/596 |

(Continued)

FOREIGN PATENT DOCUMENTS

| JP | 2008-306796 | 12/2008 |
| JP | 2009-072014 | 4/2009 |
| JP | 2013-013189 | 1/2013 |

OTHER PUBLICATIONS

Japanese Office Action for corresponding JP Application No. 2013-126044, dated Dec. 25, 2014.

*Primary Examiner* — Hanh Nguyen
(74) *Attorney, Agent, or Firm* — Mori & Ward, LLP

(57) ABSTRACT

A stator core for a rotating electric machine includes a plurality of split cores. Each of the plurality of split cores includes a back yoke, a tooth, and a single caulking portion. When each of the plurality of split cores is seen in an axial direction, two inner circumferential-side intersections and two outer circumferential-side intersections are defined, both circumferential-end surfaces of the tooth intersect an inner circumferential surface of the back yoke at the two inner circumferential-side intersections, virtual lines drawn by extending both the circumferential-end surfaces of the tooth intersect an outer circumferential surface of the back yoke at the two outer circumferential-side intersections, a central position of the caulking portion is disposed in an opposing angular region on a radially outer side out of four opposing angular regions defined by lines diagonally connecting the two inner circumferential-side intersections to the respective two outer circumferential-side intersections.

9 Claims, 11 Drawing Sheets

(56) References Cited

U.S. PATENT DOCUMENTS

| | | | | |
|---|---|---|---|---|
| 2010/0001612 A1* | 1/2010 | Nagai | ............. | H02K 15/022 |
| | | | | 310/216.043 |
| 2012/0306311 A1* | 12/2012 | Endo | ............. | H02K 1/185 |
| | | | | 310/216.113 |
| 2013/0249346 A1* | 9/2013 | Nagai | ............. | H02K 1/146 |
| | | | | 310/216.065 |

* cited by examiner

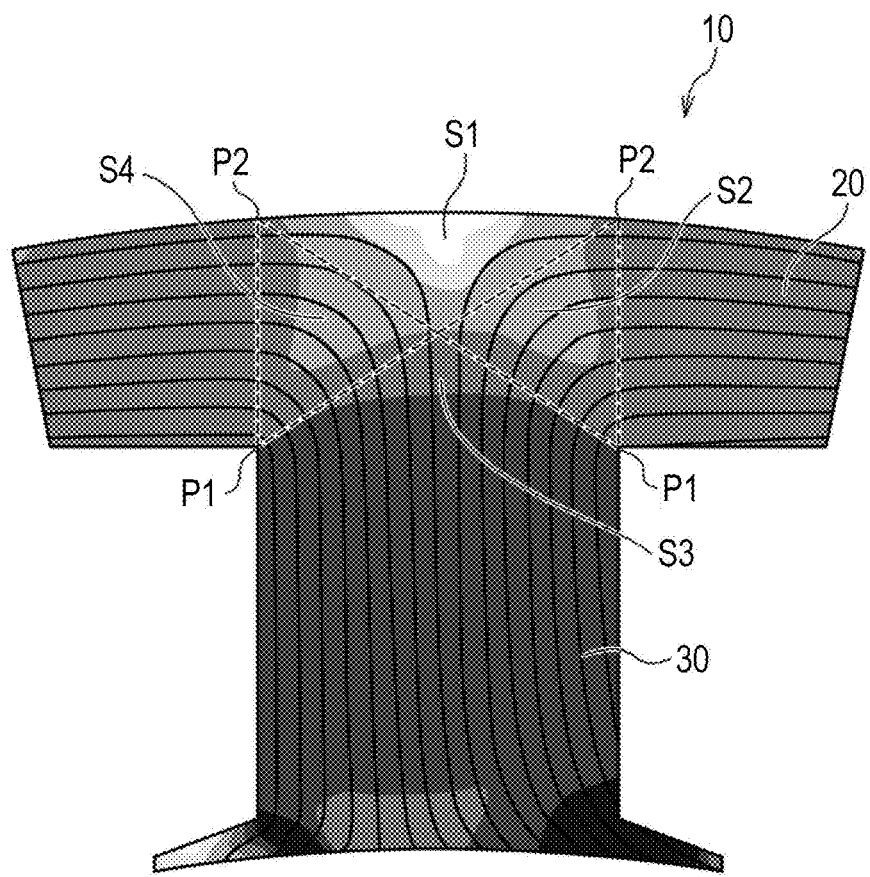

STATOR CORE FOR ROTATING ELECTRIC MACHINE

CROSS-REFERENCE TO RELATED APPLICATIONS

The present application claims priority under 35 U.S.C. § 119 to Japanese Patent Application No. 2013-126044, filed Jun. 14, 2013, entitled "Stator Core for Rotating Electric Machine." The contents of this application are incorporated herein by reference in their entirety.

BACKGROUND

1. Field

The present disclosure relates to a stator core for a rotating electric machine.

2. Description of the Related Art

A core block formed by laminating a plurality of thin metal plates is described in Japanese Unexamined Patent Application Publication No. 2009-72014. The plurality of thin metal plates of the core block are fastened to one another and laminated on one top of another by using a single caulking portion and by bonding at plurality positions thereof.

A good lamination state is maintained by using the caulking portion and the adhesive as described above to laminate the plurality of thin metal plates, and an increase in iron loss is suppressed by using a single caulking portion.

SUMMARY

According to one aspect of the present invention, a stator core for a rotating electric machine includes a plurality of split cores. The plurality of split cores are each separately formed by laminating a plurality of steel plates in an axial direction. The split cores are arranged in an annular shape. Each of the split cores includes a back yoke that has a specified radial width and extends in an arc shape, a tooth that projects from a circumferentially middle portion of the back yoke to a radially inner side, and a single caulking portion. A coil is wound around the tooth. The laminated plurality of steel plates are fastened to one another so as to be integrally secured to one another by using the caulking portion. The caulking portion is formed in the back yoke. The caulking portion has a projection portion having a rectangular region, which has short sides and long sides and projects toward one side in the axial direction, and a recess portion formed in a rear surface of the projection portion and having a region, which has the same shape as that of the projection portion and is recessed toward the one side in the axial direction, in each of the specific steel plates so as to have a flat caulking shape. The projection portion of each of the specific steel plates is engaged with the recess portion of another steel plate adjacent thereto in a laminating direction so as to be fastened to one another. When each of the split cores is seen in the axial direction, two inner circumferential-side intersections and two outer circumferential-side intersections are defined, both circumferential-end surfaces of the tooth intersect an inner circumferential surface of the back yoke at the two inner circumferential-side intersections, virtual lines drawn by extending both the circumferential-end surfaces of the tooth intersect an outer circumferential surface of the back yoke at the two outer circumferential-side intersections, and a central position of the caulking portion is disposed in an opposing angular region on a radially outer side out of four opposing angular regions defined by lines diagonally connecting the two inner circumferential-side intersections to the respective two outer circumferential-side intersections. The long sides of each of the caulking portions extend in the radial direction.

According to another aspect of the present invention, a stator core for a rotating electric machine includes a plurality of split cores. The plurality of split cores are each separately formed by laminating a plurality of steel plates in an axial direction. The split cores are arranged in an annular shape. Each of the split cores includes a back yoke that has a specified radial width and extends in an arc shape, a tooth that projects from a circumferentially middle portion of the back yoke to a radially inner side, and a single caulking portion. A coil is wound around the tooth. The laminated plurality of steel plates are fastened to one another so as to be integrally secured to one another by using the caulking portion. The caulking portion is formed in the back yoke. The caulking portion has a projection portion having a triangular region, which projects toward the radially inner side and projects toward one side in the axial direction, and a recess portion formed in a rear surface of the projection portion and having a region, which has the same shape as that of the projection portion and is recessed toward the one side in the axial direction, in each of the specific steel plates so as to have a flat caulking shape. The projection portion of each of the specific steel plates is engaged with the recess portion of another steel plate adjacent thereto in a laminating direction so as to be fastened to one another. When each of the split cores is seen in the axial direction, two inner circumferential-side intersections and two outer circumferential-side intersections are defined, both circumferential-end surfaces of the tooth intersect an inner circumferential surface of the back yoke at the two inner circumferential-side intersections, virtual lines drawn by extending both the circumferential-end surfaces of the tooth intersect an outer circumferential surface of the back yoke at the two outer circumferential-side intersections, and the caulking portion is disposed in an opposing angular region on a radially outer side out of four opposing angular regions defined by lines diagonally connecting the two inner circumferential-side intersections to the respective two outer circumferential-side intersections.

According to further aspect of the present invention, a stator core for a rotating electric machine includes a plurality of split cores. The plurality of split cores are arranged in an annular shape. Each of the plurality of split cores includes a plurality of steel plates laminated in an axial direction of the annular shape. Each of the plurality of split cores includes a back yoke, a tooth, and a single caulking portion. The back yoke has an arc shape extending along a circumferential direction of the annular shape and has a specified width in a radial direction of the annular shape. The tooth projects from a circumferentially middle portion of the back yoke inwardly in the radial direction. A coil is to be wound around the tooth. The single caulking portion is provided in the back yoke. The plurality of steel plates laminated in the axial direction are fastened to one another so as to be integrally secured to one another using the caulking portion. The caulking portion includes a projection portion and a recess portion. The projection portion has a rectangular region, which has short sides and long sides and which projects toward one side in the axial direction. The recess portion is formed in a rear surface of the projection portion and has a region, which has a same shape as a shape of the projection portion and is recessed toward the one side in the axial direction, in each of the specific steel plates so as to have a flat caulking shape. The projection portion of each of the specific steel plates is engaged with the recess portion of another steel plate adjacent thereto in a laminating direction so as to be fastened to one another. When each of the plurality of split cores is seen in the axial direction, two inner circumferential-side intersections and two outer circumferential-side intersections are defined, both circumferential-end surfaces of the tooth intersect an inner circumferential surface of the back yoke at the two inner circumferential-side intersections, virtual lines drawn by extending both the circumferential-end surfaces of the tooth intersect an outer circumferential surface of the back yoke at the two outer circumferential-side intersections, a central position of the caulking portion is disposed in an opposing angular region on a radially outer side out of four opposing angular regions defined by lines diagonally connecting the two inner circumferential-side intersections to the respective two outer circumferential-side intersections. The long sides of each of the caulking portions extend in the radial direction.

According to the other aspect of the present invention, a stator core for a rotating electric machine includes a plurality of split cores. The plurality of split cores are arranged in an annular shape. Each of the plurality of split cores includes a plurality of steel plates laminated in an axial direction of the annular shape. Each of the plurality of split cores includes a back yoke, a tooth, and a single caulking portion. The back yoke has an arc shape extending along a circumferential direction of the annular shape and has a specified width in a radial direction of the annular shape. The tooth projects from a circumferentially middle portion of the back yoke inwardly in the radial direction. A coil is to be wound around the tooth. The single caulking portion is provided in the back yoke. The plurality of steel plates laminated in the axial direction are fastened to one another so as to be integrally secured to one another using the caulking portion. The caulking portion includes a projection portion and a recess portion. The projection portion has a triangular region, which projects toward a radially inner side and projects toward one side in the axial direction. The recess portion is formed in a rear surface of the projection portion and has a region, which has a same shape as a shape of the projection portion and is recessed toward the one side in the axial direction, in each of the specific steel plates so as to have a flat caulking shape. The projection portion of each of the specific steel plates is engaged with the recess portion of another steel plate adjacent thereto in a laminating direction so as to be fastened to one another. When each of the plurality of split cores is seen in the axial direction, two inner circumferential-side intersections and two outer circumferential-side intersections are defined, both circumferential-end surfaces of the tooth intersect an inner circumferential surface of the back yoke at the two inner circumferential-side intersections, virtual lines drawn by extending both the circumferential-end surfaces of the tooth intersect an outer circumferential surface of the back yoke at the two outer circumferential-side intersections, the caulking portion is disposed in an opposing angular region on a radially outer side out of four opposing angular regions defined by lines diagonally connecting the two inner circumferential-side intersections to the respective two outer circumferential-side intersections.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 11 illustrates a distribution of the magnetic flux density in the split core.

DESCRIPTION OF THE EMBODIMENTS

Figure 1:
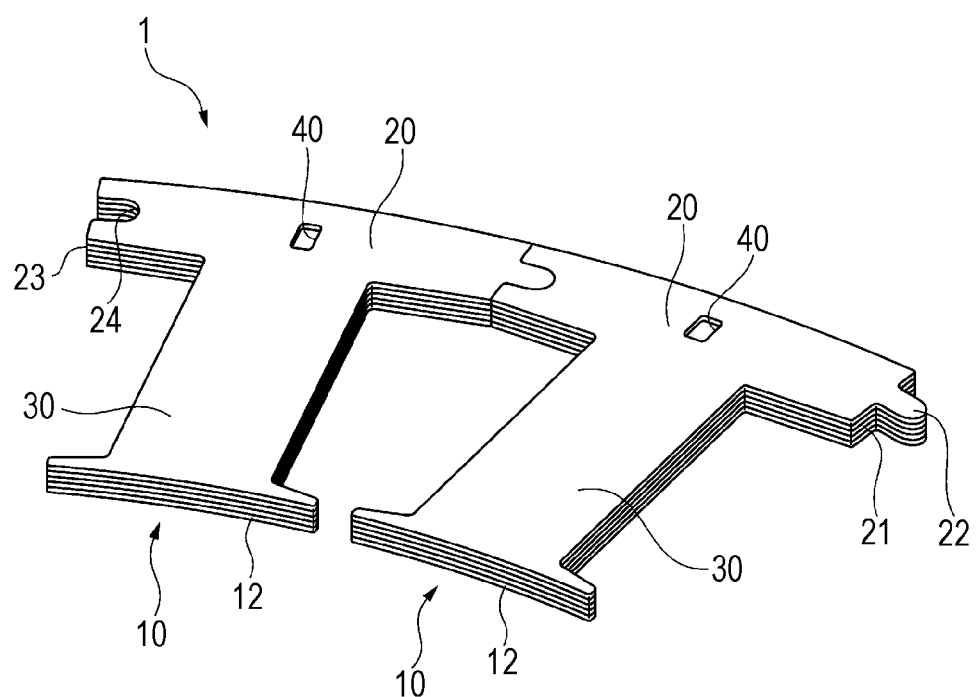
FIG. 1 is a perspective view of part of a stator core for a rotating electric machine according to a first embodiment.

The embodiments will now be described with reference to the accompanying drawings, wherein like reference numerals designate corresponding or identical elements throughout the various drawings.

Embodiments of the present disclosure will be described below with reference to the drawings. The drawings are to be seen in a direction in which reference numerals are oriented.

First Embodiment

As illustrated in FIG. 1, a stator core 1 according to the present embodiment includes a plurality of split cores 10 arranged in an annular shape in a circumferential direction. A stator (not shown) that includes this stator core 1 in combination with a rotor (not shown) provided therein forms a rotating electric machine (not shown), which is used as, for example, an electric motor or a power generator.

Figure 2A:
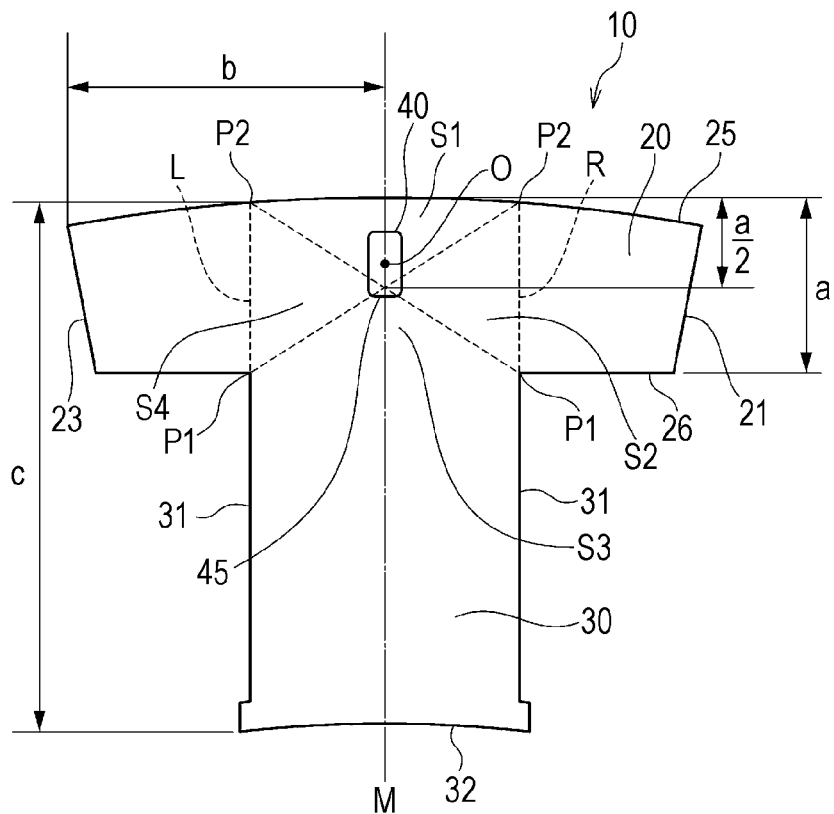
FIG. 2A is a plan view of a split core according to the first embodiment seen in the axial direction.

Each of the split cores 10 is separately formed by stacking a plurality of steel plates 12 in the axial direction (up-down direction in FIG. 1). The steel plates 12 having a substantially T shape are formed by punching with a press. Referring also to FIG. 2A, the split cores 10 each has a back yoke 20 and a tooth 30. The back yoke 20 has a specified radial width and extends in an arc shape. The tooth 30 radially inwardly projects from a circumferentially middle portion of the back yoke 20. A coil (not shown) is wound around the tooth 30 with an insulator or the like around the tooth disposed therebetween. Accordingly, the split core 10 has a shape that is substantially line symmetric about a virtual line M that passes through a circumferentially middle portion of the split core 10.

In FIG. 2A, when a denotes the radial width of the back yoke 20, b denotes a half the circumferential width of the split core 10 (back yoke 20), and c denotes the radial width of the split core 10, the split core 10 according to the present embodiment is set to satisfy the following relationships: a<b<c.

A projection portion 22 and a recess portion 24 are formed in the back yoke 20. The projection portion 22 projects in the circumferential direction from a radially middle portion of one circumferential-end surface 21. The recess portion 24, which has a shape conforming to that of the projection portion 22, is recessed in a radially middle portion of another circumferential-end surface 23. The projection portion 22 and the recess portion 24 are omitted from FIG. 2A for simplicity. The projection portion 22 and the recess portion 24 are also omitted in FIG. 3A and the other drawings after that for the same reason. The split cores 10 adjacent to one another in the circumferential direction are connected to one another by press fitting the projection portions 22 into the recess portions 24 with a specified interference.

Furthermore, the split cores 10 have caulking portions 40. The laminated plurality of steel plates 12 are fastened to one another to be integrally secured to one another with the caulking portions 40. The back yoke 20 of each split core 10 has a single caulking portion 40.

Figure 2B:
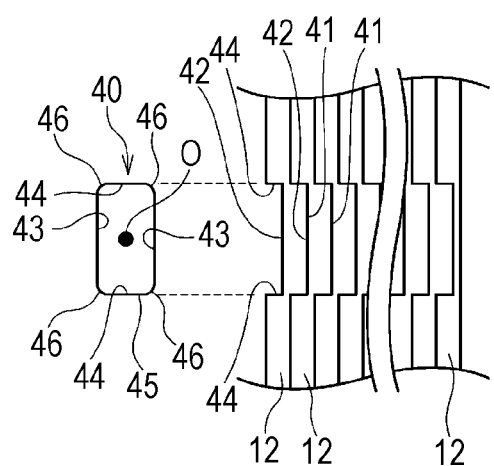
FIG. 2B is a sectional view of a caulking portion and a region near the caulking portion of the split core according to the first embodiment.

As illustrated in FIG. 2B, the caulking portion 40 is formed by, for example, punching with a press. The caulking portion 40 has a projection portion 41 and a recess portion 42 in each of the specific steel plates 12. The projection portion 41 is formed by causing a rectangular region, which has short sides perpendicular to the radial direction and long sides in the radial direction, to project to one side in the axial direction by a certain amount. The recess portion 42 is formed by recessing a region having the same shape as that of the projection portion 41 to the one side in the axial direction in a rear surface of the projection portion 41 (surface on the other side in the axial direction). The steel plates 12 are fastened to one another by causing the projection portion 41 of each of the specific steel plates 12 to be engaged with the recess portion 42 of another steel plate 12 adjacent thereto in the axial direction.

The caulking portion 40 has a flat caulking shape in which both circumferential-end surfaces 43 and both radial-end surfaces 44 extend in the axial direction.

Four angle portions 46 of the caulking portion 40 have a rounded shape formed of curve. Desirably, the size of the curve of the rounded shape is larger than the thickness (thickness in the axial direction) of the steel plate 12. With such a rounded shape, the projection portions 41 of the steel plates 12 and the recess portions 42 of the adjacent steel plates 12 become easily engaged with one another, and the tightening force for press-fitting in a caulking process became easily reliably obtained. This allows joint strength to be easily reliably obtained for the steel plates 12 adjacent to one another. Furthermore, when the caulking portion 40 is formed by punching, the above-described rounded shape allows punched states (length of shearing or sagging) of the angle portions 46 and liner portions to become more similar to one another. This reduces burdens applied to the corners of a punch. Thus, stable punched states can be maintained.

A central position O of the caulking portion 40 is set in the virtual line M that extends in the circumferentially middle portion of the split core 10, and a distance in the radial direction between a radially outer end portion of an outer circumferential surface 25 of the back yoke 20 and the central position O are set to be equal to or smaller than a/2. That is, when seen in the axial direction, the central position O of the caulking portion 40 is disposed in an opposing angular region S1 on the radially outer side out of four opposing angular regions S1 to S4. These S1, S2, S3, and S4 are four opposing angular regions, which are defined by lines diagonally connecting P1 and P2, on the radially outer side, the one side in the circumferential direction, the radially inner side, and the other side in the circumferential direction, respectively. Here, when seen in the axial direction, P1 denotes two inner circumferential-side intersections, at which both circumferential-end surfaces 31 of the tooth 30 intersect an inner circumferential surface 26 of the back yoke 20, and P2 denotes two outer circumferential-side intersections, at which virtual lines L and R drawn by extending both the circumferential-end surfaces 31 of the tooth 30, intersect the outer circumferential surface 25 of the back yoke 20. A radially inner end portion 45 of the caulking portion 40 is disposed in the opposing angular region S3 on the radially inner side.

Second Embodiment

Next, the stator core 1 of a rotating electric machine according to the second embodiment of the present disclosure is described. The only difference between the stator core 1 of the first embodiment and that of second embodiment having the same basic structure as that of the first embodiment, is that the structure of the caulking portion of the second embodiment is different from that of the first embodiment. Thus, the same or corresponding portions are denoted by the same reference signs, thereby simplifying or omitting description thereof.

Figure 3A:
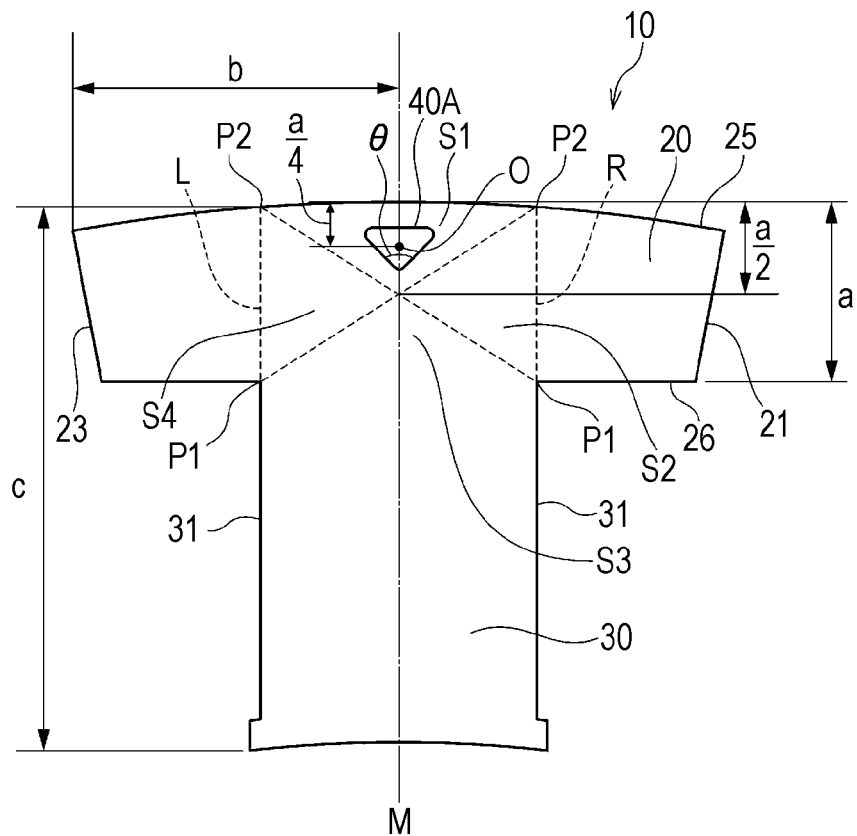
FIG. 3A is a plan view of the split core according to a second embodiment seen in the axial direction.
Figure 3B:
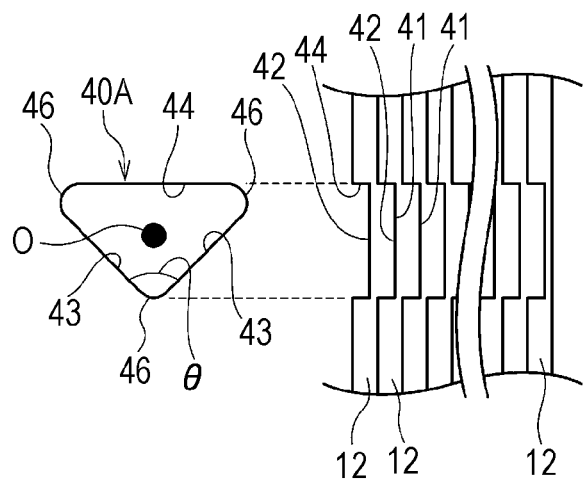
FIG. 3B is a sectional view of a caulking portion and a region near the caulking portion of the split core according to the second embodiment.

As illustrated in FIGS. 3A and 3B, in a caulking portion 40A according to the present embodiment, the projection portions 41 and the recess portions 42 have a triangular shape that radially inwardly projects when seen in the axial direction.

Similarly to the caulking portion 40 according to the first embodiment, the caulking portion 40A has the flat caulking shape in which both the circumferential-end surfaces 43 and the radial-end surface 44 linearly extend in the axial direction. The three angle portions 46 of the caulking portion 40A have a rounded shape formed of a curve. Desirably, the size of the curve of the rounded shape is larger than the thickness (thickness in the axial direction) of the steel plate 12.

Here, the central position O of the caulking portion 40A is set in the virtual line M that extends in the circumferentially middle portion of the split core 10. In addition, the distance in the radial direction between the radially outer end portion of the outer circumferential surface 25 of the back yoke 20 and the central position O is set to be a/4. Furthermore, the entirety of the caulking portion 40A is disposed in the opposing angular region S1 on the radially outer side.

Comparison of First Embodiment, Second Embodiment, First Comparative Example, and Second Comparative Example Next, various performance characteristics required for integrally securing the laminated plurality of steel plates 12 in the split core 10 according to the above-described first and second embodiments were analyzed. The performance characteristics include eddy current loss, joint strength, and lamination accuracy (lamination parallelism, lamination squareness, and lamination thickness in and near the caulking portion). The results are illustrated in FIGS. 4 to 8.

Here, in FIGS. 4 to 8, the analysis results of first and second comparative examples are also illustrated for comparison with those of the first and second embodiments.

Figure 9A:
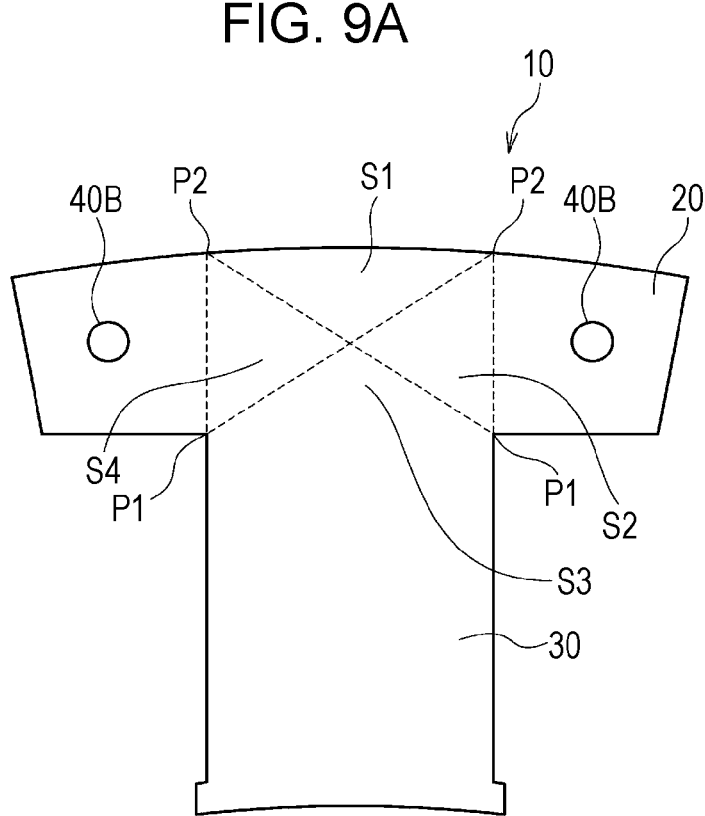
FIG. 9A is a plan view of a split core according to a first comparative example seen in the axial direction.
Figure 9B:
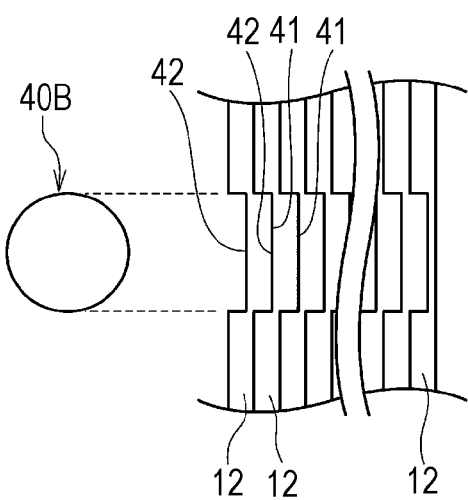
FIG. 9B is a sectional view of a caulking portion and a region near the caulking portion of the split core according to the first comparative example.

Referring to FIGS. 9A and 9B, a pair of caulking portions 40B are provided in both the side portions of the back yoke 20 in the circumferential direction in the split core 10 according to the first comparative example. The projection portions 41 and recess portions 42 of the caulking portions 40B have circular shapes when seen in the axial direction. Similarly to the caulking portions 40 and 40A according to the first and second embodiments, the caulking portions 40B have a flat caulking shape that linearly extends in the axial direction.

Figure 10A:
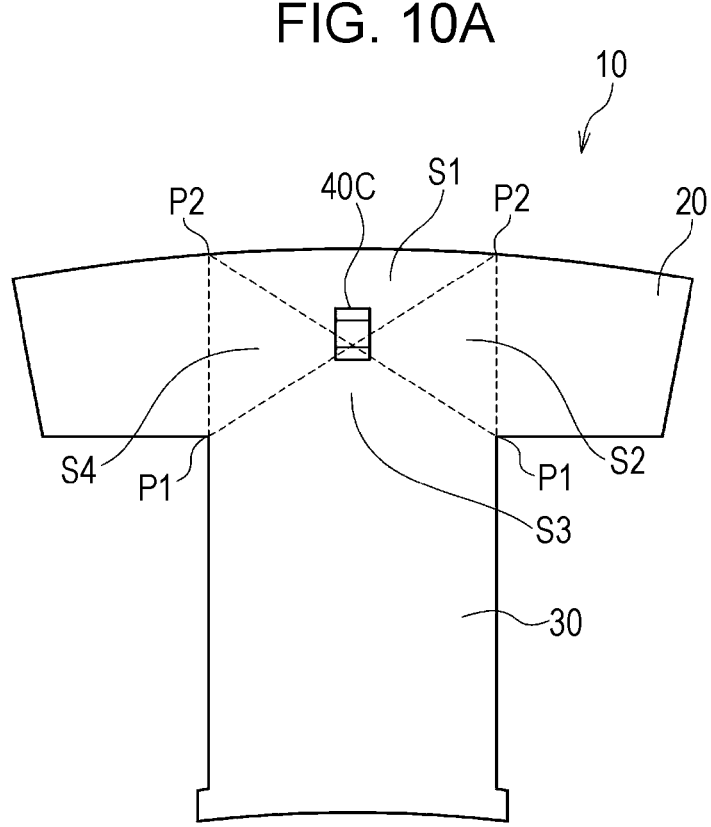
FIG. 10A is a plan view of a split core according to a second comparative example seen in the axial direction.
Figure 10B:
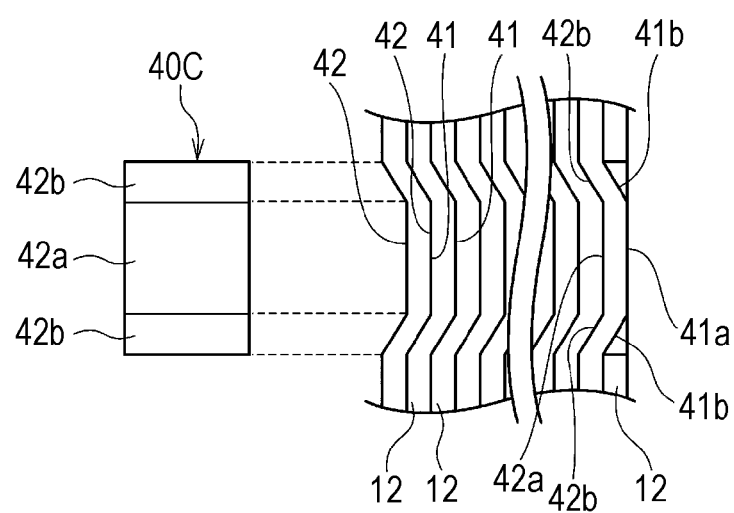
FIG. 10B is a sectional view of a caulking portion and a region near the caulking portion of the split core according to the second comparative example.

Referring to FIGS. 10A and 10B, in the split core 10 according to the second comparative example, a caulking portion 40C is provided in the circumferentially middle portion of the back yoke 20. The caulking portion 40C has a rectangular shape in which long sides of the projection portions 41 and the recess portions 42 extend in the radial direction when seen in the axial direction.

Here, in the caulking portion 40C, each of the projection portions 41 has a flat surface 41a and each of the recess portions 42 has a flat surface 42a. The flat surfaces 41a and 42a are perpendicular to the axial direction. The projection portion 41 and the recess portion 42 also have a pair of inclined surfaces 41b and a pair of inclined surfaces 42b, respectively. The inclined surfaces 41b and the inclined surfaces 42b extend toward the other side in the axial direction as they extend from the flat surfaces 41a and 42a toward respective radial sides. Thus, the caulking portion 40C has a V-projection caulking shape. Unlike the first and second embodiments, four angle portions of the caulking portion 40C have a square shape.

When seen in the axial direction, the area of the caulking portion 40 according to the first embodiment is increased by about 12% compared to that of the caulking portion 40C according to the second comparative example. When seen in the axial direction, the area of the caulking portion 40A according to the second embodiment is increased by about 20% compared to that of the caulking portion 40C according to the second comparative example.

Figure 6:
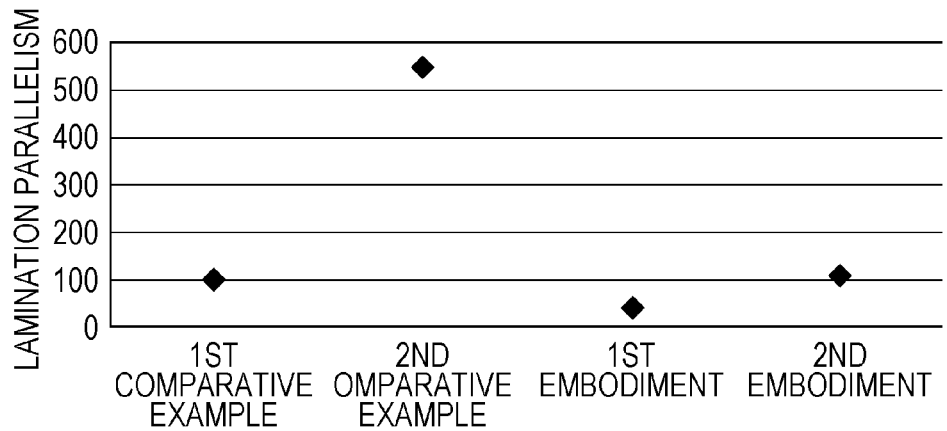
FIG. 6 illustrates results of analysis of lamination parallelism.
Figure 7:
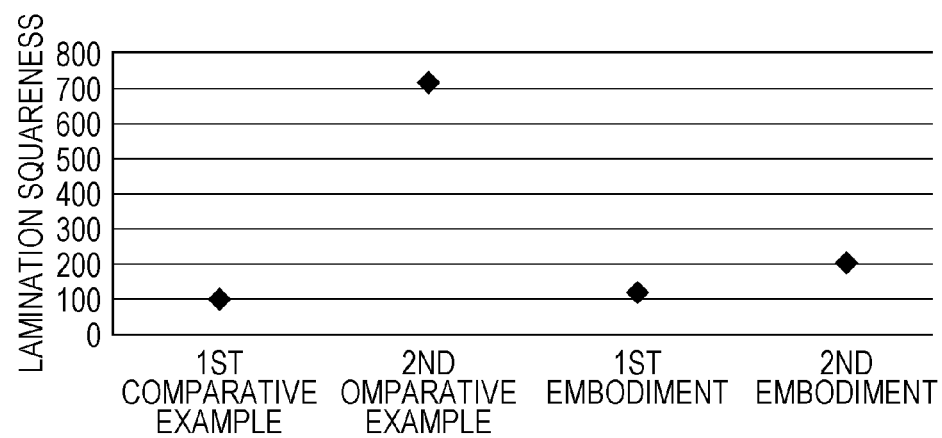
FIG. 7 illustrates results of analysis of lamination squareness.
Figure 8:
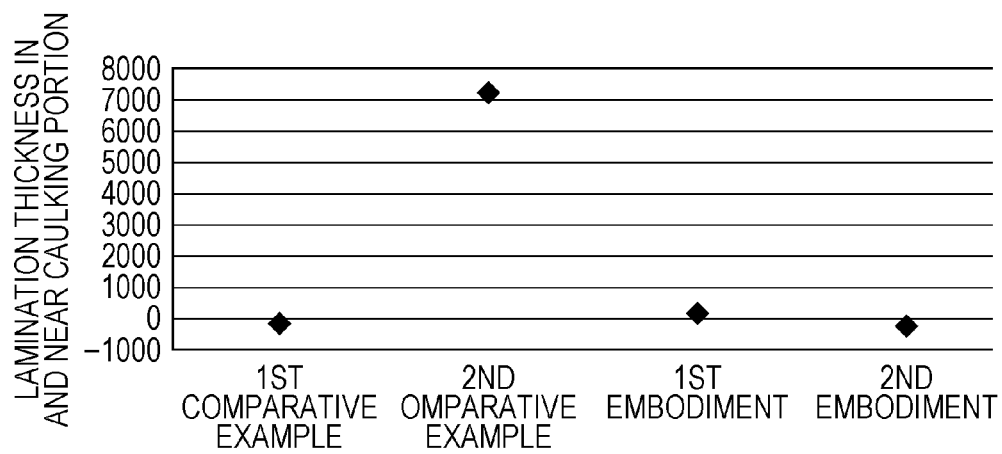
FIG. 8 illustrates results of analysis of the lamination thickness in and near the caulking portion.

It is noted that, in FIGS. 4 to 7, values related to the split core 10 according to the first comparative example are set to 100 as reference values, and, in FIG. 8, a value related to the split core 10 according to the first comparative example is set to −100 as a reference value.

Figure 4:
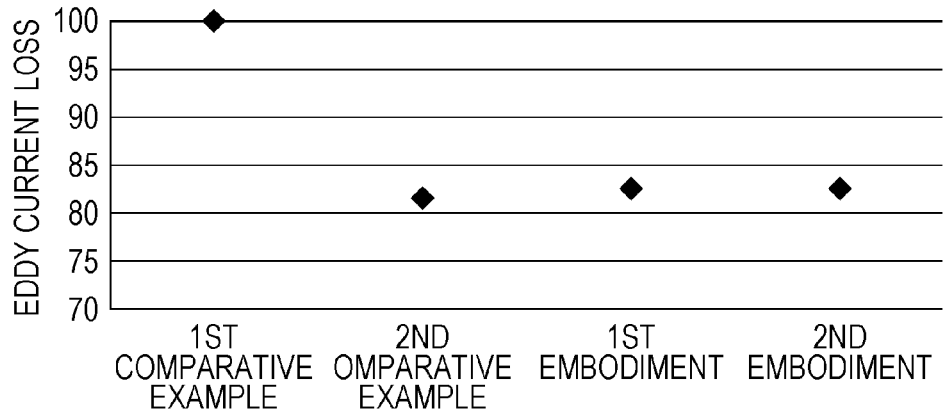
FIG. 4 illustrates results of analysis of eddy current losses.

Eddy current loss in FIG. 4 refers to eddy current losses occurring in the caulking portions 40, 40A, 40B, and 40C while the coils are energized. Joint strength in FIG. 5 refers to a joint strength with which the plurality of steel plates 12 are joined to one another. Lamination parallelism in FIG. 6 refers to the parallelism of upper and lower surfaces to each other of the laminated plurality of steel plates 12. As the value decreases, the upper and lower surfaces become closer to parallel to each other. Lamination squareness in FIG. 7 refers to the size of an angle formed between one end surface in the axial direction and an outer circumferential surface of the split core 10. As this value decreases, the angle becomes close to the right angle. Lamination thickness in and near caulking portion in FIG. 8 refers to deviation in thickness in and near the caulking portion 40 of the split core 10 in the axial direction with respect to a value given by {thickness of steel plate 12 (thickness in axial direction)×number of laminated steel plates 12}.

Analysis of Eddy Current Loss

First, as illustrated in FIG. 4, eddy current losses in the first and second embodiments and the second comparative example are reduced to about 80% of that in the first comparative example. It is thought that these are mainly caused by the difference in the positions of the caulking portions 40, 40A, 40B, and 40C. Further discussion about this is as follows.

In a stator core such as the stator core 1 according to the embodiment of the present disclosure formed by connecting the plurality of split cores 10, a magnetic flux generated by energizing the coil and a magnetic flux generated from the rotor side flow through loops starting from the specific teeth 30, passing through the back yoke 20 toward the one and the other sides in the circumferential direction, passing through other teeth 30 and the rotor, and returning back to the specific tooth 30.

Figure 12A:
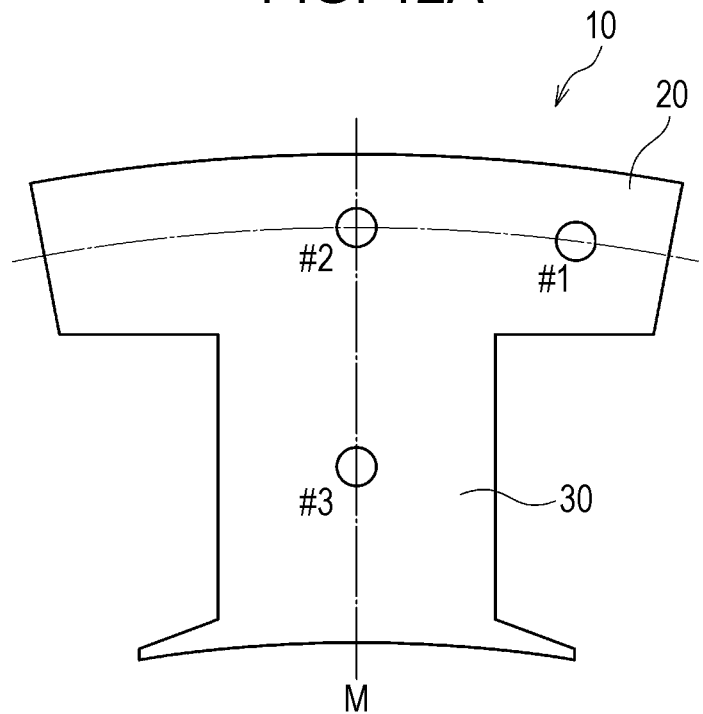
FIGS. 12A and 12B illustrate a change in magnetic flux density over time in the split core.
Figure 12B:
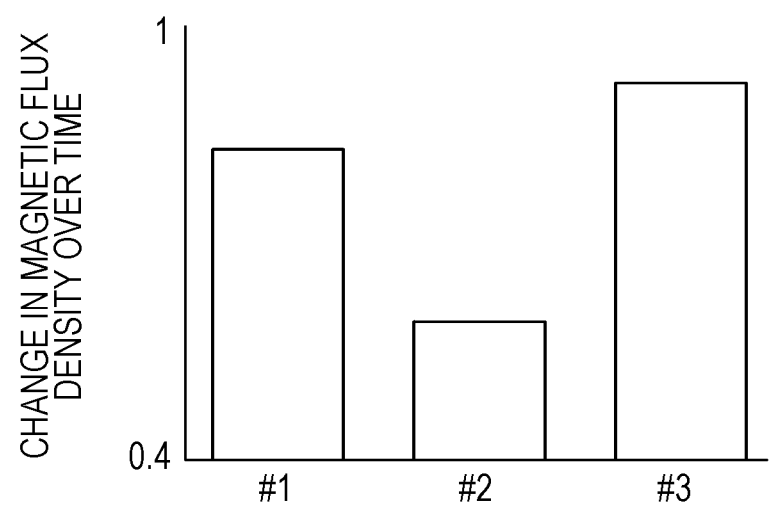
Figure 13:
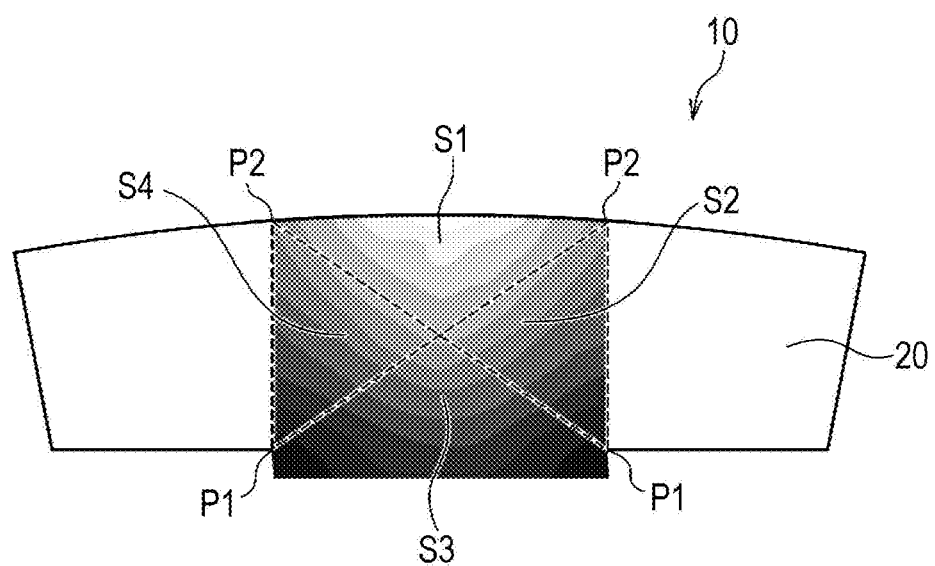
FIG. 13 illustrates a distribution of the change in magnetic flux density over time in and near a circumferentially middle portion of the back yoke.

Here, FIG. 11 illustrates a distribution of the magnetic flux density in the split core 10 when a specified size of a current flows through the split core 10 using a gray scale image. In dark regions, the magnetic flux density is large, and in bright regions, the magnetic flux density is smaller. FIG. 12B illustrates the magnitude of a change in magnetic flux density over time at first to third positions of the split core 10 while the coil is energized. The first position #1 is on the one side in the circumferential direction in the radially middle portion of the back yoke 20. The second position #2 is in the circumferentially middle portion of the radially middle portion of the back yoke 20. The third position #3 is in the circumferentially middle portion of the radially middle portion of the tooth 30. FIG. 13 illustrates a distribution of the change in magnetic flux density over time in and near the circumferentially middle portion of the back yoke 20 while the coil is energized in a gray scale image. In dark regions, the change in magnetic flux density over time is large, and in bright regions, the change in magnetic flux density over time is small.

As illustrated In FIG. 11, the magnetic flux density in the split core 10 is comparatively large in the tooth 30 and portions of the back yoke 20 between a pair of the teeth 30 in the circumferential direction. Furthermore, as illustrated in FIGS. 12A and 12B, the change in magnetic flux density over time in the split core 10 increases in the following order: second position #2, first position #1, and third position #3. That is, the change in magnetic flux density over time is large in the tooth 30 and the portions of the back yoke 20 between the pair of teeth 30 in the circumferential direction and small in the circumferentially middle portion of the back yoke 20.

As described above, in the tooth 30 and the portions of the back yoke 20 between the pair of teeth 30 in the circumferential direction, the magnetic flux density and the change in magnetic flux density over time are large. Thus, when the caulking portion is provided at these positions, the eddy current losses are increased. Accordingly, it is desirable that the caulking portion be provided in and near the circumferentially middle portion of the back yoke 20 where the magnetic flux density and the change in magnetic flux density over time are comparatively small.

Furthermore, referring to FIGS. 11 and 13, it can be seen that in and near the circumferentially middle portion of the back yoke 20, the magnetic flux density and the change in magnetic flux density over time are reducing toward the radially outer side. That is, it can be seen that the magnetic flux density and the change in magnetic flux density over time reduce in the following order: the opposing angular region S3 on the radially inner side, the opposing angular regions S2 and S4 on both the sides in the circumferential direction, and the opposing angular region S1 on the radially outer side. Thus, it is desirable that, in the split core 10, the caulking portion be provided on the radially outer side of the circumferentially middle portion and a region near the circumferentially middle portion of the back yoke 20.

In the first embodiment (see FIGS. 2A and 2B), the central position O of the caulking portion 40 is disposed in the opposing angular region S1 on the radially outer side. This suppresses an increase in the eddy current losses, which occurs in the caulking portion 40 while the coil is energized.

Figure 14:
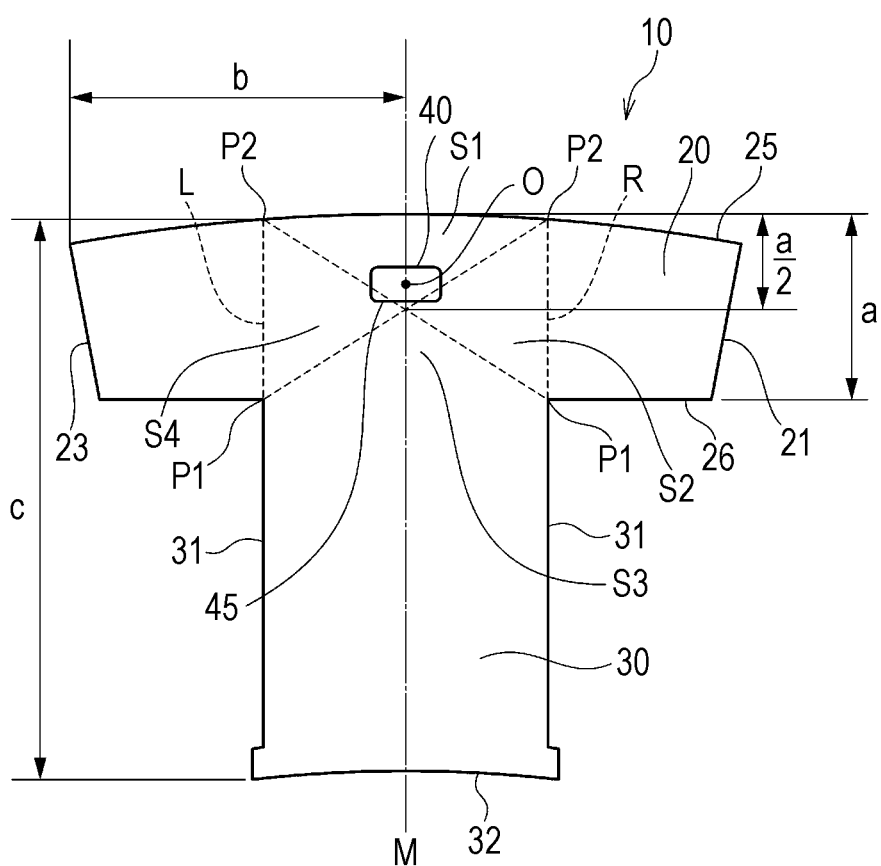
FIG. 14 is a plan view of a split core according to a third comparative example seen in the axial direction.

In particular, in the first embodiment, the long sides of the rectangular caulking portion 40 extend in the radial direction. Thus, the occurrence of a situation, in which the caulking portion 40 is positioned in regions where the change in magnetic flux density is large, can be suppressed compared to the case where the short sides of the rectangular caulking portion 40 extend in the radial direction as is the case with a third comparative example illustrated in FIG. 14. Accordingly, the increase in the eddy current losses, which occurs in the caulking portion 40 while the coil is energized, can be suppressed. It is noted that eddy current losses occurring when the short sides of the caulking portion 40 extend in the radial direction as illustrated in FIG. 14 were analyzed under the condition in which the area of the caulking portion 40 is substantially the same as that of the caulking portion 40 of the first embodiment. As a result, it has been turned out that the eddy current losses occurring in the caulking portion 40 illustrated in FIG. 14 are increased to a value about 1.6 times larger than that occurring in the caulking portion 40 of the first embodiment.

In the second embodiment (see FIGS. 3A and 3B), the triangular caulking portion 40A is disposed in the opposing angular region S1 on the radially outer side. Thus, the caulking portion 40A can be disposed in a region where the magnetic flux density and the change in magnetic flux density over time are small. This suppresses the increase in the eddy current losses, which occurs in the caulking portion 40A while the coil is energized.

Here, an opening angle θ of the apex of the triangular shape of the caulking portion 40A, the apex being on the radially inner side, is set to be comparatively small so that the caulking portion 40A is positioned in a region of the back yoke 20 where the amount of change in magnetic flux density over time (see FIG. 13) is equal to or smaller than a specified value while the coil is energized. Thus, the increase in the eddy current losses is more effectively suppressed.

In the second comparative example (see FIGS. 10A and 10B), the caulking portion 40C is disposed in and near the opposing angular region S1 on the radially outer side. Thus, the increase in the eddy current losses is suppressed.

In contrast, in the first comparative example (see FIGS. 9A and 9B), the pair of caulking portions 40B are provided in the portions of the back yoke 20 between the pair of teeth 30 in the circumferential direction. That is, the caulking portions 40B are provided in positions where the magnetic flux density and the change in magnetic flux density over time are large. This increases the eddy current losses. Thus, the caulking portions 40B according to the first comparative example do not satisfy the performance required for integrally securing the laminated plurality of steel plates 12.

Analysis of Joint Strength

Figure 5:
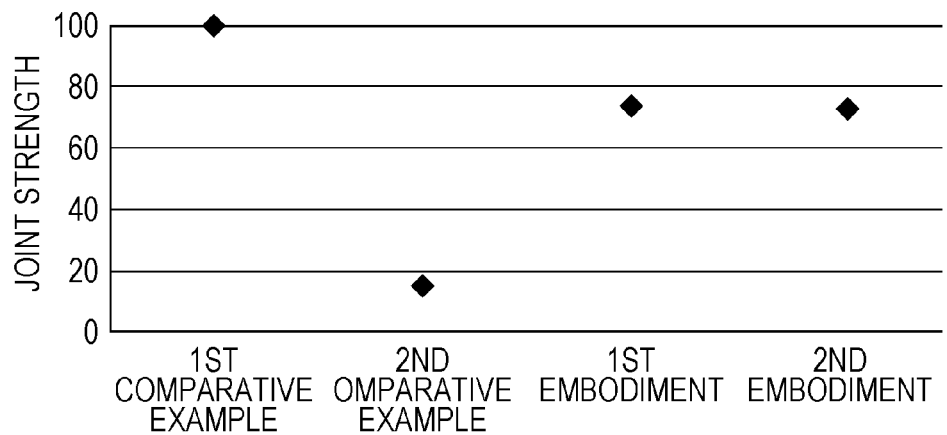
FIG. 5 illustrates results of analysis of joint strength.

Referring next to FIG. 5, joint strength increases in the following order: the second comparative example, the second embodiment, the first embodiment, and the first comparative example. Here, a joint strength of about "45" or greater is required for integrally securing the laminated plurality of steel plates 12 to one another. This condition is satisfied in the first and second embodiments and the first comparative example.

It is thought that the reason for this result is as follow. That is, in the first and second embodiments and the second comparative example, a single caulking portion 40, a single caulking portion 40A, and a single caulking portion 40C are formed in the respective split cores 10. Accordingly, the joint strength is decreased compared to that obtained with the first comparative example, in which the pair of caulking portions 40B are formed in a corresponding one of split cores 10.

Furthermore, when seen in the axial direction, the area of the caulking portion 40 according to the first embodiment is increased by about 12% compared to that of the caulking portion 40C according to the second comparative example. When seen in the axial direction, the area of the caulking portion 40A according to the second embodiment is increased by about 20% compared to that of the caulking portion 40C according to the second comparative example. Thus, the joint strength of the first and second embodiments is significantly improved compared to the second comparative example.

In the caulking portion 40C having the V-projection caulking shape according to the second comparative example, as illustrated in FIG. 10B, the radially end portions of the inclined surfaces 41b and 42b of the projection portions 41 and the recess portions 42 are rounded. Thus, the projection portions 41 and the recess portions 42 of the steel plates 12 adjacent to one another in the axial direction cannot be highly accurately engaged with one another. Furthermore, by caulking the V-projection caulking shape, only the two sides (two surfaces) in the radial direction effectively function for holding the lamination. As a result, in the second comparative example, the size of gaps between the steel plates 12 adjacent to one another increases in and near the caulking portion 40C. Thus, it is thought to be impossible to allow the entire area of the caulking portion 40C to effectively function so as to obtain joint strength. In contrast, since the caulking portions 40 and 40A according to the first and second embodiments have the flat caulking shapes, the formation of the gaps between the steel plates 12 adjacent to one another is suppressed, and accordingly, joint strength is improved compared to that obtained by the second comparative example.

Furthermore, since the angle portions 46 of the caulking portions 40 and 40A according to the first and second embodiments are rounded, the tightening force for press-fitting in a caulking process became easily reliably obtained. This improves the joint strength of the steel plates 12 adjacent to one another.

Thus, in the first and second embodiments and the first comparative example, a sufficient joint strength is obtained for joining the laminated plurality of steel plates 12 to one another. However, in the second comparative example, the joint strength is low and the performance required for integrally securing the laminated plurality of steel plates 12 is not satisfied.

The joint strength of the second comparative example may be improved by increasing the area of the caulking portion 40C according to the second comparative example such that the area of the caulking portion 40C is about the same as that of the caulking portion 40 according to the first embodiment or the caulking portion 40A according to the second embodiment. In this case, however, the eddy current losses are increased. Thus, it is difficult to improve the joint strength and suppress the eddy current losses at the same time.

Analysis of Lamination Parallelism and Lamination Squareness

As illustrated in FIGS. 6 and 7, the lamination parallelism and the lamination squareness are degraded most in the second comparative example. In the first and second embodiments and the first comparative example, a good lamination parallelism and a good lamination squareness are obtained. Here, a lamination parallelism of about "200" or smaller and a lamination squareness of about "500" or smaller are required for integrally securing the laminated plurality of steel plates 12 to one another. These conditions are satisfied in the first and second embodiments and the first comparative example. However, in the second comparative example, neither of the lamination parallelism and the lamination squareness required for integrally securing the laminated plurality of steel plates 12 is not satisfied.

It is thought that the reason for these results is as follows: as mentioned above, regarding the first comparative example, a single pair of caulking portions 40B according to the first comparative example are provided for each of the split cores 10; regarding the first and second embodiments, the area of the caulking portion 40 according to the first embodiment and the area of the caulking portion 40A according to the second embodiment are respectively larger than the area of the caulking portions 40C according to the second comparative example by about 12% and 20%, and accordingly, the entire area of the caulking portion 40 and the entire area of 40A easily effectively hold the respective laminated structures (gaps between the steel plates 12 adjacent to one another is unlikely to be formed in the caulking portions 40 and 40A). Thus, a good lamination parallelism and a good lamination squareness are obtained in the first and second embodiments and the first comparative example.

In particular, compared to the case where the short sides of the rectangular caulking portion 40 extend in the radial direction as is the case with the third comparative example illustrated in FIG. 14, an increase in distance between the caulking portion 40 and a radially inner end portion 32 of the tooth 30 can be suppressed with the first embodiment, in which the long sides of the rectangular caulking portion 40 extend in the radial direction. Thus, reduction of the lamination parallelism can be suppressed at the radially inner end portion 32 of the tooth 30, the radially inner end portion 32 being comparatively far from the caulking portion 40. This can also suppress reduction of the lamination parallelism of the entire split core 10. When the short sides of the caulking portion 40 extend in the radial direction as illustrated in FIG. 14, according to the analysis result of the lamination parallelism haven been performed under the condition in which the area of the caulking portion 40 illustrated in FIG. 14 is substantially the same as that of the caulking portion 40 according to the present embodiment (see FIGS. 2A and 2B), the lamination parallelism of the split core 10 illustrated in FIG. 14 is degraded to a value about five times that of the split core 10 according to the first embodiment. The above-described structure is particularly effective when, as is the case with the split core 10 according to the present embodiment, the relationship between a half the circumferential width of the split core 10 (back yoke 20) b and the radial width of the split core 10 c is represented by b<c and the distance between the caulking portion 40 and the radially inner end portion 32 of the tooth 30 is comparatively large.

Analysis of Lamination Thickness in and Near Caulking Portion

As illustrated in FIG. 8, the lamination thickness in and near the caulking portion is very large and degraded in the second comparative example. In the first and second embodiments and the first comparative example, a good lamination thickness is obtained in and near the caulking portion.

It is thought that the reason for this is as follows: that is, in the caulking portion 40C having the V-projection caulking shape according to the second comparative example, as illustrated in FIG. 10B, the radially end portions of the inclined surfaces 41b and 42b of the projection portions 41 and the recess portions 42 are rounded. Thus, the projection portions 41 and the recess portions 42 of the steel plates 12 adjacent to one another in the axial direction cannot be highly accurately engaged with one another. As a result, it is thought that, in the second comparative example, the size of the gaps between the steel plates 12 adjacent to one another increases in and near the caulking portion 40C, and the space factor of the steel plates 12 is degraded and the lamination thickness in and near the caulking portion is significantly increased.

Accordingly, in order to improve the space factor of the laminated steel plates, the flat caulking shape similar to the caulking portions 40 or 40A of the first or second embodiment is effective.

Analysis of Strength Against Rotation

Although it is not illustrated in FIGS. 4 to 8, strength against rotation of the plurality of steel plates 12 when forces in the rotational direction are applied was analyzed with the first and second embodiments and the first and second comparative examples.

As a result, in the first and second embodiments and the first comparative example, a good strength against rotation is obtained. However, in the second comparative example, strength against rotation was low and the plurality of steel plates 12 are likely to rotate relative to one another.

It is thought that, in the second comparative example, this is caused by poor lamination accuracy (lamination parallelism, lamination squareness, and lamination thickness in and near the caulking portion) due to a low joint strength as described above.

Compared to the case where the caulking portion has a circular shape, joint strength against forces in the rotational direction is reliably obtained with the caulking portion 40 having a rectangular shape in the first embodiment and with the caulking portion 40A having a triangular shape in the second embodiment.

As has been described, in the stator core 1 of the rotating electric machine according to the first embodiment, the central position O of the rectangular caulking portion 40 is disposed in the opposing angular region S1 on the radially outer side. Thus, the caulking portion 40 can be disposed in a region where the magnetic flux density and the change in magnetic flux density over time are comparatively small. Accordingly, the increase in the eddy current losses, which occurs in the caulking portion 40 while the coil is energized, can be suppressed.

Since the long sides of the rectangular caulking portion 40 extend in the radial direction, the occurrence of a situation, in which the caulking portion 40 is positioned in regions where the magnetic flux density and the change in magnetic flux density over time are large, can be suppressed compared to the case where the short sides of the rectangular caulking portion 40 extend in the radial direction. Accordingly, the increase in the eddy current losses, which occurs in the caulking portion 40 while the coil is energized, can be suppressed.

Thus, even when the area of the caulking portion 40 is increased so as to improve joint strength and lamination accuracy (lamination parallelism, lamination squareness, and lamination thickness in and near the caulking portion), the increase in the eddy current losses can be suppressed.

Since the long sides of the rectangular caulking portion 40 extend in the radial direction, the occurrence of a situation, in which the distance between the caulking portion 40 and the radially inner end portion 32 of the tooth 30 is increased, can be suppressed compared to the case where the short sides of the rectangular caulking portion 40 extend in the radial direction. Accordingly, degradation of lamination accuracy can be suppressed at the radially inner end portion 32 of the tooth 30.

Since a single caulking portion 40 is provided in each split core 10, productivity is improved and, compared to the case where two or more caulking portions 40 are provided in each split core 10, the increase in the eddy current losses can be suppressed.

When a single caulking portion 40 is provided in each split core 10 and the caulking portion 40 has, for example, a circular shape, the plurality of steel plates are likely to rotate relative to one another. However, when the caulking portion 40 has a rectangular shape, joint strength can be reliably obtained also against forces in the rotational direction.

Since the caulking portion 40 has the flat caulking shape, compared to the case where, for example, the V-projection caulking shape is formed, the space factor of the steel plates 12 can be improved by suppressing the formation of the gaps between the steel plates 12 adjacent to one another and joint strength or lamination accuracy can be improved by allowing the entire area (perimeter, that is, four sides) of the caulking portion 40 to effectively function.

Since the radially inner end portion 45 of the caulking portion 40 is disposed in the opposing angular region S3 on the radially inner side, the occurrence of a situation, in which the distance between the radially inner end portion 45 of the caulking portion 40 and the radially inner end portion 32 of the tooth 30 is increased, can be suppressed. Accordingly, degradation of lamination accuracy can be suppressed at the radially inner end portion 32 of the tooth 30, which is comparatively far from the caulking portion 40.

Furthermore, in the stator core 1 of the rotating electric machine according to the second embodiment, the triangular caulking portion 40A is disposed in the opposing angular region S1 on the radially outer side. Thus, the caulking portion 40A can be disposed in a region where the magnetic flux density and the change in magnetic flux density over time are comparatively small. Accordingly, the increase in the eddy current losses, which occurs in the caulking portion 40A while the coil is energized, can be suppressed.

Furthermore, the caulking portion 40A has a triangular shape that projects toward the radially inner side. This can facilitate acquisition of the area of the caulking portion 40A while allowing the caulking portion 40A to be disposed in the opposing angular region S1 on the radially outer side, where the magnetic flux density and the change in magnetic flux density over time are comparatively small. Thus, the area of the caulking portion 40A can be increased so as to improve joint strength and lamination accuracy while the increase in the eddy current losses can be suppressed.

Furthermore, since a single caulking portion 40A is provided in each split core 10, productivity is improved and, compared to the case where two or more caulking portions 40A are provided in each split core 10, the increase in the eddy current losses can be suppressed. When a single caulking portion 40A is provided in each split core 10 and the caulking portion 40A has, for example, a circular shape, the plurality of steel plates are likely to rotate relative to one another. However, when the caulking portion 40A has a triangular shape, joint strength can be reliably obtained also against forces in the rotational direction.

Since the caulking portion 40A has the flat caulking shape, compared to the case where, for example, the V-projection caulking shape is formed, the space factor of the steel plates can be improved by suppressing the formation of the gaps between the steel plates 12 adjacent to one another and joint strength or lamination accuracy can be improved by allowing the entire area (perimeter, that is, three sides) of the caulking portion 40A to effectively function.

Furthermore, the opening angle θ of the apex of the triangular shape of the caulking portion 40A, the apex being on the radially inner side, is set so that the caulking portion 40A is positioned in a region of the back yoke 20 where the amount of change in magnetic flux density over time is equal to or smaller than the specified value while the coil is energized. Thus, the caulking portion 40A is disposed in the region of the opposing angular region S1 on the radially outer side, the region of the opposing angular region S1 being a region where the amount of change in magnetic flux density over time is desirable. Accordingly, the increase in the eddy current losses can be more effectively suppressed.

Furthermore, the angle portions 46 of the caulking portions 40 and 40A according to the first and second embodiments are rounded. This allows the projection portion 41 of each of the specific steel plates 12 to be easily engaged with the recess portion 42 of another steel plate 12 adjacent thereto in the laminating direction.

Furthermore, the tightening force for press-fitting in a caulking process became easily reliably obtained. This allows the joint strength of the steel plates 12 adjacent to one another to be easily reliably obtained. Furthermore, when the caulking portions 40 and 40A are formed by punching, the above-described rounded shape allows punched states (length of shearing or sagging) of the angle portions 46 and liner portions to become more similar to one another. This reduces burdens applied to the corners of a punch. Thus, stable punched states can be maintained. Furthermore, when the caulking portions 40 and 40A are formed by punching, shearing stress occurring in the angle portions 46 can be reduced.

Although the embodiments of the present disclosure have been described, various design changes of the embodiments of the present disclosure are possible without departing from the gist of the present disclosure.

For example, the rectangular caulking portion 40 according to the first embodiment may be entirely disposed in the opposing angular region S1 on the radially outer side.

A stator core (for example, a stator core 1 for a rotating electric machine described above in the embodiments) for a rotating electric machine according to a first aspect of an embodiment of the present disclosure includes a plurality of split cores (for example, split cores 10 described above in the embodiments) that are each separately formed by laminating a plurality of steel plates (for example, steel plates 12 described above in the embodiments) in an axial direction, and are arranged in an annular shape. Each of the split cores includes a back yoke (for example, a back yoke 20 described above in the embodiments) that has a specified radial width and extends in an arc shape, a tooth (for example, a tooth 30 described above in the embodiments), around which the coil is wound and which projects from a circumferentially middle portion of the back yoke to a radially inner side, and a single caulking portion (for example, a caulking portion 40 described above in the embodiments) that is formed in the back yoke and used to fasten the laminated plurality of steel plates to one another so as to integrally secure the steel plates to one another. The caulking portion has a projection portion (for example, a projection portion 41 described above in the embodiments) having a rectangular region, which has short sides and long sides and projects toward one side in the axial direction, and a recess portion (for example, a recess portion 42 described above in the embodiments) formed in a rear surface of the projection portion and having a region, which has the same shape as that of the projection portion and is recessed toward the one side in the axial direction, in each of the specific steel plates so as to have a flat caulking shape. The projection portion of each of the specific steel plates is engaged with the recess portion of another steel plate adjacent thereto in a laminating direction so as to be fastened to one another. When each of the split cores is seen in the axial direction, two inner circumferential-side intersections (for example, inner circumferential-side intersections P1 described above in the embodiments) and two outer circumferential-side intersections (for example, P2 described above in the embodiments) are defined. Both circumferential-end surfaces (for example, circumferential-end surfaces 31 described above in the embodiments) of the tooth intersect an inner circumferential surface (for example, an inner circumferential surface 26 described above in the embodiments) of the back yoke at the two inner circumferential-side intersections, and virtual lines (for example, virtual lines L and R described above in the embodiments) drawn by extending both the circumferential-end surfaces of the tooth intersect an outer circumferential surface (for example, an outer circumferential surface 25 described above in the embodiments) of the back yoke at the two outer circumferential-side intersections. A central position of the caulking portion is disposed in an opposing angular region (for example, an opposing angular region S1 described above in the embodiments) on a radially outer side out of four opposing angular regions (for example, opposing angular regions S1, S2, S3, and S4 describedbove in the embodiments) defined by lines diagonally connecting the two inner circumferential-side intersections to the respective two outer circumferential-side intersections. The long sides of each of the caulking portions extend in the radial direction.

According to the first aspect of the embodiment of the present disclosure, the central position of the rectangular caulking portion is disposed in the opposing angular region on the radially outer side. Thus, the caulking portion can be disposed in a region where the magnetic flux density and a change in magnetic flux density over time are comparatively small. Accordingly, an increase in the eddy current losses, which occurs in the caulking portion while the coil is energized, can be suppressed.

Since the long sides of the rectangular caulking portion extend in the radial direction, the occurrence of a situation, in which the caulking portion is positioned in regions where the magnetic flux density and the change in magnetic flux density over time are large, can be suppressed compared to the case where the short sides of the rectangular caulking portion extend in the radial direction. Accordingly, the increase in the eddy current losses, which occurs in the caulking portion while the coil is energized, can be suppressed.

Thus, even when the area of the caulking portion is increased so as to improve joint strength and lamination accuracy (lamination parallelism, lamination squareness, and lamination thickness in and near the caulking portion), the increase in the eddy current losses can be suppressed.

Since the long sides of the rectangular caulking portion extend in the radial direction, the occurrence of a situation, in which the distance between the caulking portion and the radially inner end portion of the tooth is increased, can be suppressed compared to the case where the short sides of the rectangular caulking portion extend in the radial direction. Accordingly, degradation of lamination accuracy can be suppressed at the radially inner end portion of the tooth.

Furthermore, since a single caulking portion is provided in each split core, productivity is improved and, compared to the case where two or more caulking portions are provided in each split core, the increase in the eddy current losses can be suppressed.

When a single caulking portion is provided in each split core and the caulking portion has, for example, a circular shape, the plurality of steel plates are likely to rotate relative to one another. However, when the caulking portion has a rectangular shape, joint strength can be reliably obtained also against forces in the rotational direction.

Since the caulking portion has the flat caulking shape, compared to the case where, for example, the V-projection caulking shape is formed, the space factor of the steel plates can be improved by suppressing the formation of the gaps between the steel plates adjacent to one another and joint strength or lamination accuracy can be improved by allowing the entire area of the caulking portion to effectively function.

A radially inner end portion (for example, a radially inner end portion 45 described above in the embodiments) of each of the caulking portions may be disposed in the opposing angular region on the radially inner side (for example, an opposing angular region S3).

Thus, the occurrence of a situation, in which the distance between the radially inner end portion of the caulking portion and the radially inner end portion of the tooth is increased, can be suppressed. Accordingly, degradation of lamination accuracy can be suppressed at the radially inner end portion of the tooth, which is comparatively far from the caulking portion.

A stator core (for example, a stator core 1 for a rotating electric machine described above in embodiments) for a rotating electric machine according to a second aspect of an embodiment of the present disclosure includes a plurality of split cores (for example, split cores 10 described above in the embodiments) that are each separately formed by laminating a plurality of steel plates (for example, steel plates 12 described above in the embodiments) in an axial direction, and are arranged in an annular shape. Each of the split cores includes a back yoke (for example, a back yoke 20 described above in the embodiments) that has a specified radial width and extends in an arc shape, a tooth (for example, a tooth 30 described above in the embodiments), around which the coil is wound and which projects from a circumferentially middle portion of the back yoke to a radially inner side, and a single caulking portion (for example, a caulking portion 40A described above in the embodiments) that is formed in the back yoke and used to fasten the laminated plurality of steel plates to one another so as to integrally secure the steel plates to one another. The caulking portion has a projection portion (for example, a projection portion 41 described above in the embodiments) having a triangular region, which projects toward the radially inner side and projects toward one side in the axial direction, and a recess portion (for example, a recess portion 42 described above in the embodiments) formed in a rear surface of the projection portion and having a region, which has the same shape as that of the projection portion and is recessed toward the one side in the axial direction, in each of the specific steel plates so as to have a flat caulking shape. The projection portion of each of the specific steel plates is engaged with the recess portion of another steel plate adjacent thereto in a laminating direction so as to be fastened to one another. When each of the split cores is seen in the axial direction, two inner circumferential-side intersections (for example, an inner circumferential-side intersection P1 described above in the embodiments) and two outer circumferential-side intersections (for example, P2 described above in the embodiments) are defined. Both circumferential-end surfaces (for example, circumferential-end surfaces 31 described above in the embodiments) of the tooth intersect an inner circumferential surface (for example, an inner circumferential surface 26 described above in the embodiments) of the back yoke at the two inner circumferential-side intersections, and virtual lines (for example, virtual lines L and R described above in the embodiments) drawn by extending both the circumferential-end surfaces of the tooth intersect an outer circumferential surface (for example, an outer circumferential surface 25 described above in the embodiments) of the back yoke at the two outer circumferential-side intersections. The caulking portion is disposed in an opposing angular region (for example, an opposing angular region S1 described above in the embodiments) on a radially outer side out of four opposing angular regions (for example, opposing angular regions S1, S2, S3, and S4 described above in the embodiments) defined by lines diagonally connecting the two inner circumferential-side intersections to the respective two outer circumferential-side intersections.

According to a second aspect of the embodiment of the present disclosure, the triangular caulking portion is disposed in the opposing angular region on the radially outer side. Thus, the caulking portion can be disposed in a region where the magnetic flux density and the change in magnetic flux density over time are comparatively small. Accordingly, the increase in the eddy current losses, which occurs in the caulking portion while the coil is energized, can be suppressed.

Furthermore, the caulking portion has a triangular shape that projects toward the radially inner side. This can facilitate acquisition of the area of the caulking portion while allowing the caulking portion to be disposed in the opposing angular region on the radially outer side, where the magnetic flux density and the change in magnetic flux density over time are comparatively small. Thus, the area of the caulking portion can be increased so as to improve joint strength and lamination accuracy while the increase in the eddy current losses can be suppressed.

Furthermore, since a single caulking portion is provided in each split core, productivity is improved and, compared to the case where two or more caulking portions are provided in each split core, the increase in the eddy current losses can be suppressed.

When a single caulking portion is provided in each split core and the caulking portion has, for example, a circular shape, the plurality of steel plates are likely to rotate relative to one another. However, when the caulking portion has a triangular shape, joint strength can be reliably obtained also against forces in the rotational direction.

Since the caulking portion has the flat caulking shape, compared to the case where, for example, the V-projection caulking shape is formed, the space factor of the steel plates can be improved by suppressing the formation of the gaps between the steel plates adjacent to one another and joint strength or lamination accuracy can be improved by allowing the entire area of the caulking portion to effectively function.

Preferably, in each of the split cores, an opening angle (for example, an opening angle θ described above in the embodiments) of an apex of the triangular shape of the caulking portion, the apex being disposed on the radially inner side, is set so that the caulking portion is positioned in a region of the back yoke where the amount of change in magnetic flux density over time is equal to or smaller than a specified value while the coil is energized.

Thus, the increase in the eddy current losses can be more effectively suppressed.

Preferably, in each of the split cores, angle portions (for example, angle portions 46 described above in the embodiments) of the rectangular or triangular caulking portion are rounded.

Thus, the projection portion of each of the specific steel plates can be easily engaged with the recess portion of another steel plate adjacent thereto in the laminating direction, and joint strength can be easily reliably obtained.

Furthermore, when the caulking portion is formed by punching, the above-described rounded shape allows punched states (length of shearing or sagging) of the angle portions and liner portions to become more similar to one another. This reduces burdens applied to the corners of a punch. Thus, stable punched states can be maintained.

Obviously, numerous modifications and variations of the present invention are possible in light of the above teachings. It is therefore to be understood that within the scope of the appended claims, the invention may be practiced otherwise than as specifically described herein.

What is claimed is:

1. A stator core for a rotating electric machine, comprising:
   a plurality of split cores each separately formed by laminating a plurality of steel plates in an axial direction, the split cores being arranged in an annular shape,
   wherein each of the split cores includes
      a back yoke that has a specified radial width and extends in an arc shape,
      a tooth that projects from a circumferentially middle portion of the back yoke to a radially inner side, a coil being wound around the tooth, and
      a single caulking portion, the laminated plurality of steel plates being fastened to one another so as to be integrally secured to one another by using the caulking portion, the caulking portion being formed in the back yoke,
   wherein, the caulking portion has a projection portion having a rectangular region, which has short sides and long sides and projects toward one side in the axial direction, and a recess portion formed in a rear surface of the projection portion and having a region, which has the same shape as that of the projection portion and is recessed toward the one side in the axial direction, in each of the specific steel plates so as to have a flat caulking shape,
   wherein the projection portion of each of the specific steel plates is engaged with the recess portion of another steel plate adjacent thereto in a laminating direction so as to be fastened to one another,
   wherein, when each of the split cores is seen in the axial direction, two inner circumferential-side intersections and two outer circumferential-side intersections are defined, both circumferential-end surfaces of the tooth intersect an inner circumferential surface of the back yoke at the two inner circumferential-side intersections, virtual lines drawn by extending both the circumferential-end surfaces of the tooth intersect an outer circumferential surface of the back yoke at the two outer circumferential-side intersections, and a central position of the caulking portion is disposed in an opposing angular region on a radially outer side out of four opposing angular regions defined by lines diagonally connecting the two inner circumferential-side intersections to the respective two outer circumferential-side intersections, wherein the long sides of each of the caulking portions extend in the radial direction, and wherein a radially inner end portion of each of the caulking portions is disposed in the opposing angular region on the radially inner side.

2. The stator core according to claim 1,
wherein, in each of the split cores, angle portions of the rectangular caulking portion are rounded.

3. The stator core according to claim 1,
wherein the back yoke has circumferential-end surfaces with a projection formed on one circumferential-end surface and a recess formed on another circumferential-end surface, the recess being configured to receive the projection of an adjacent split core.

4. The stator core according to claim 3,
wherein the projection projects in a circumferential direction from a radially middle portion of the one circumferential-end surface,
wherein the recess has a shape conforming to that of the projection, and
wherein the recess is recessed in a radially middle portion of the another circumferential-end surface.

5. A stator core for a rotating electric machine, comprising:
a plurality of split cores arranged in an annular shape, each of the plurality of split cores comprising a plurality of steel plates laminated in an axial direction of the annular shape, each of the plurality of split cores comprising:
a back yoke having an arc shape extending along a circumferential direction of the annular shape and having a specified width in a radial direction of the annular shape;
a tooth projecting from a circumferentially middle portion of the back yoke inwardly in the radial direction, a coil being to be wound around the tooth; and
a single caulking portion provided in the back yoke, the plurality of steel plates laminated in the axial direction being fastened to one another so as to be integrally secured to one another using the caulking portion, the caulking portion comprising:
a projection portion having a rectangular region, which has short sides and long sides and which projects toward one side in the axial direction;
a recess portion formed in a rear surface of the projection portion and having a region, which has a same shape as a shape of the projection portion and is recessed toward the one side in the axial direction, in each of the specific steel plates so as to have a flat caulking shape;
the projection portion of each of the specific steel plates being engaged with the recess portion of another steel plate adjacent thereto in a laminating direction so as to be fastened to one another;
when each of the plurality of split cores is seen in the axial direction, two inner circumferential-side intersections and two outer circumferential-side intersections being defined, both circumferential-end surfaces of the tooth intersecting an inner circumferential surface of the back yoke at the two inner circumferential-side intersections, virtual lines drawn by extending both the circumferential-end surfaces of the tooth intersecting an outer circumferential surface of the back yoke at the two outer circumferential-side intersections, a central position of the caulking portion being disposed in an opposing angular region on a radially outer side out of four opposing angular regions defined by lines diagonally connecting the two inner circumferential-side intersections to the respective two outer circumferential-side intersections; and
the long sides of each of the caulking portions extending in the radial direction,
wherein a radially inner end portion of each of the caulking portions is disposed in the opposing angular region on a radially inner side.

6. The stator core according to claim 5,
wherein, in each of the plurality of split cores, angle portions of the rectangular caulking portion are rounded.

7. The stator core according to claim 5,
wherein the back yoke has circumferential-end surfaces with a projection formed on one circumferential-end surface and a recess formed on another circumferential-end surface, the recess being configured to receive the projection of an adjacent split core.

8. The stator core according to claim 7,
wherein the projection projects in a circumferential direction from a radially middle portion of the one circumferential-end surface,
wherein the recess has a shape conforming to that of the projection, and
wherein the recess is recessed in a radially middle portion of the another circumferential-end surface.

9. A stator core for a rotating electric machine, comprising:
a plurality of split cores arranged in an annular shape, each of the plurality of split cores comprising a plurality of steel plates laminated in an axial direction of the annular shape, each of the plurality of split cores comprising:
a back yoke having an arc shape extending along a circumferential direction of the annular shape and having a specified width in a radial direction of the annular shape;
a tooth projecting from a circumferentially middle portion of the back yoke inwardly in the radial direction, a coil being to be wound around the tooth; and
a single caulking portion provided in the back yoke, the plurality of steel plates laminated in the axial direction being fastened to one another so as to be integrally secured to one another using the caulking portion, the caulking portion comprising:
a projection portion having a rectangular region, which has short sides and long sides and which projects toward one side in the axial direction;
a recess portion formed in a rear surface of the projection portion and having a region, which has a same shape as a shape of the projection portion and is recessed toward the one side in the axial direction, in each of the specific steel plates so as to have a flat caulking shape;

the projection portion of each of the specific steel plates being engaged with the recess portion of another steel plate adjacent thereto in a laminating direction so as to be fastened to one another;

when each of the plurality of split cores is seen in the axial direction, two inner circumferential-side intersections and two outer circumferential-side intersections being defined, both circumferential-end surfaces of the tooth intersecting an inner circumferential surface of the back yoke at the two inner circumferential-side intersections, virtual lines drawn by extending both the circumferential-end surfaces of the tooth intersecting an outer circumferential surface of the back yoke at the two outer circumferential-side intersections, a central position of the caulking portion being disposed in an opposing angular region on a radially outer side out of four opposing angular regions defined by lines diagonally connecting the two inner circumferential-side intersections to the respective two outer circumferential-side intersections; and the long sides of each of the caulking portions extending in the radial direction, wherein the central position of the caulking portion is provided on a virtual line which extends from a circumferentially middle portion of each of the plurality of split cores inwardly in the radial direction, and wherein a distance in the radial direction between a radially outer end portion of the outer circumferential surface of the back yoke and the central position is set to be equal to or smaller than one half of the specified width.

* * * * *